United States Patent [19]

Wilson

[11] Patent Number: 4,811,229
[45] Date of Patent: Mar. 7, 1989

[54] CONTROL SYSTEM FOR AUTOMATIC GUIDED VEHICLES

[75] Inventor: Richard A. Wilson, Everett, Wash.

[73] Assignee: Hewlett-Packard Company, Palo Alto, Calif.

[21] Appl. No.: 500

[22] Filed: Jan. 5, 1987

[51] Int. Cl.$^4$ .................................................. G06F 15/50
[52] U.S. Cl. .................................. 364/424.02; 180/169
[58] Field of Search ................ 364/424; 180/167–169; 901/1; 250/202

[56] References Cited

U.S. PATENT DOCUMENTS

| | | | |
|---|---|---|---|
| 3,708,668 | 1/1973 | Tilley | 180/169 X |
| 3,881,568 | 5/1975 | Ando et al. | 180/168 |
| 3,935,922 | 2/1976 | Cooper et al. | 180/168 |
| 3,970,840 | 7/1976 | De Bruine | 250/202 |
| 4,307,791 | 12/1981 | De Bruine | 364/424 X |
| 4,566,032 | 1/1986 | Hirooka et al. | 180/168 |
| 4,568,825 | 2/1986 | Wurster | 250/202 |
| 4,703,240 | 10/1987 | Yoshimoto et al. | 180/169 X |
| 4,711,316 | 12/1987 | Katou et al. | 180/168 |

Primary Examiner—Gary Chin
Attorney, Agent, or Firm—Bloor Redding, Jr.

[57] ABSTRACT

A control system for guiding a vehicle over a floor. The system includes a narrow length of retroflective tape applied to the floor to define a path, an array of LED-phototransistor sensors to generate light toward the tape and generate sensor output signals proportional to the portion of the sensor fields of view occupied by the retroreflective tape. The output signal of each of the sensors is compared to a stair-step reference signal during a 10 millisecond cyclic time period and a binary output signal for each sensor is generated indicating whether the amplitude of the sensor output signal is above or below the changing threshold reference signal. The binary value of each of the sensor output signals is sampled once each millisecond during the time period and the binary values are combined to generate a byte for each sampling occasion. Each of the bytes corresponds to a location in a lookup table which includes interim vehicle lateral directional and displacement commands. The commands corresponding to each of the table location values generated during the 10 millisecond period are mathematically summed to generate a final vehicle command. Two lookup tables are provided for selectively following the left or right edge of the tape.

22 Claims, 8 Drawing Sheets

| TIME SEQUENCE | BINARY OUTPUT SIGNAL OF COMPARATOR CIRCUITS | | | | | TABLE LOCATION VALUE | VEHICLE INDICATING VALUE |
|---|---|---|---|---|---|---|---|
| | 46a | 46b | 46c | 46d | 46e | | |
| 1 ms. | 1 | 1 | 1 | 1 | 1 | = 31 | 100 |
| 2 | 1 | 1 | 1 | 1 | 1 | = 31 | 100 |
| 3 | | | | | | = | |
| 4 | | | | | | = | |
| 5 | | | | | | = | |
| 6 | | | | | | = | |
| 7 | | | | | | = | |
| 8 | ↓ | ↓ | ↓ | ↓ | ↓ | = ↓ | ↓ |
| 9 | 1 | 1 | 1 | 1 | 1 | = 31 | 100 |
| 10 | 1 | 1 | 1 | 1 | 1 | = 31 | 100 |

*FIG 6A*

| TIME SEQUENCE | BINARY OUTPUT SIGNAL OF COMPARATOR CIRCUITS | | | | | TABLE LOCATION VALUE | VEHICLE INDICATING VALUE |
|---|---|---|---|---|---|---|---|
| | 46a | 46b | 46c | 46d | 46e | | |
| 1 ms. | 0 | 0 | 0 | 1 | 1 | = 3 | +2 |
| 2 | 0 | 0 | 0 | 1 | 1 | = 3 | +2 |
| 3 | 0 | | 0 | | | = 3 | |
| 4 | 0 | | 0 | | | = 3 | |
| 5 | 0 | | 0 | | | = 3 | |
| 6 | 1 | | 1 | | | = 23 | |
| 7 | 1 | | 1 | | | = 23 | |
| 8 | 1 | ↓ | 1 | ↓ | ↓ | = 23 | ↓ |
| 9 | 1 | 0 | 1 | 1 | 1 | = 23 | +2 |
| 10 | 1 | 0 | 1 | 1 | 1 | = 23 | +2 |

+20 FINAL VEHICLE COMMAND

| | BINARY OUTPUT SIGNAL OF COMPARATOR CIRCUITS | | | | | TABLE LOCATION VALUE | VEHICLE INDICATING VALUE |
|---|---|---|---|---|---|---|---|
| | 46a | 46b | 46c | 46d | 46e | | |
| 1 ms. | 0 | 0 | 0 | 1 | 1 | = 3 | +2 |
| 2 | 0 | 0 | 0 | 1 | 1 | = 3 | +2 |
| 3 | 0 | ↓ | 0 | ↓ | ↓ | = 3 | +2 |
| 4 | 1 | | 0 | | | = 19 | +1 |
| 5 | 1 | | 0 | | | = 19 | +1 |
| 6 | 1 | | 0 | | | = 19 | +1 |
| 7 | 1 | | 0 | | | = 19 | +1 |
| 8 | 1 | ↓ | 1 | ↓ | ↓ | = 23 | +2 |
| 9 | 1 | 0 | 1 | 1 | 1 | = 23 | +2 |
| 10 | 1 | 0 | 1 | 1 | 1 | = 23 | +2 |

TIME SEQUENCE

+16 FINAL VEHICLE COMMAND

FIG 6D

| | BINARY OUTPUT SIGNAL OF COMPARATOR CIRCUITS | | | | | TABLE LOCATION VALUE | VEHICLE INDICATING VALUE |
|---|---|---|---|---|---|---|---|
| | 46a | 46b | 46c | 46d | 46e | | |
| 1 ms. | 0 | 0 | 0 | 1 | 1 | = 1 | +4 |
| 2 | 1 | 0 | 0 | 1 | 1 | = 19 | +1 |
| 3 | 1 | ↓ | | ↓ | ↓ | = 19 | +1 |
| 4 | 1 | | | | | = 19 | ↓ |
| 5 | 1 | | | | | = 19 | |
| 6 | 1 | | | | | = 19 | |
| 7 | 1 | | | | | = 19 | |
| 8 | 1 | ↓ | | ↓ | ↓ | = 19 | ↓ |
| 9 | 1 | 0 | 0 | 1 | 1 | = 19 | +1 |
| 10 | 1 | 0 | 0 | 1 | 1 | = 19 | +1 |

TIME SEQUENCE

+13 FINAL VEHICLE COMMAND

|  | BINARY OUTPUT SIGNAL OF COMPARATOR CIRCUITS | | | | | TABLE LOCATION VALUE | VEHICLE INDICATING VALUE |
|---|---|---|---|---|---|---|---|
|  | 46a | 46b | 46c | 46d | 46e | | |
| 1 ms | 1 | 0 | 0 | 0 | 1 | = 17 | 0 |
| 2 | 1 | 0 | 0 | 0 | 1 | = 17 | 0 |
| 3 | ↓ | 0 | ↓ | 0 | ↓ | = 17 | ↓ |
| 4 |  | 0 |  | 0 |  | = 17 |  |
| 5 |  | 0 |  | 0 |  | = 17 |  |
| 6 |  | 1 |  | 1 |  | = 27 |  |
| 7 |  | 1 |  | 1 |  | = 27 |  |
| 8 | ↓ | 1 | ↓ | 1 | ↓ | = 27 | ↓ |
| 9 | 1 | 1 | 0 | 1 | 1 | = 27 | 0 |
| 10 | 1 | 1 | 0 | 1 | 1 | = 27 | 0 |

0 FINAL VEHICLE COMMAND

TIME SEQUENCE

FIG 6E

|  | BINARY OUTPUT SIGNAL OF COMPARATOR CIRCUITS | | | | | TABLE LOCATION VALUE | VEHICLE INDICATING VALUE |
|---|---|---|---|---|---|---|---|
|  | 46a | 46b | 46c | 46d | 46e | | |
| 1 ms. | 1 | 1 | 0 | 0 | 0 | = 24 | −1 |
| 2 | 1 | 1 | 0 | 0 | 0 | = 24 | −1 |
| 3 | ↓ | ↓ | 0 | ↓ | 0 | = 24 | −1 |
| 4 |  |  | 0 |  | 0 | = 24 | −1 |
| 5 |  |  | 0 |  | 0 | = 24 | −1 |
| 6 |  |  | 1 |  | 1 | = 29 | −2 |
| 7 |  |  | 1 |  | 1 | = 29 | −2 |
| 8 | ↓ | ↓ | 1 | ↓ | 1 | = 29 | −2 |
| 9 | 1 | 1 | 1 | 0 | 1 | = 29 | −2 |
| 10 | 1 | 1 | 1 | 0 | 1 | = 29 | −2 |

−15 FINAL VEHICLE COMMAND

TIME SEQUENCE

CONTROL SYSTEM FOR AUTOMATIC GUIDED VEHICLES

TECHNICAL FIELD

The present invention relates to a control system for guiding a wheeled vehicle over a floor along a predetermined path.

BACKGROUND OF THE INVENTION

In certain situations, it is desirable to have a robotic vehicle which can autonomously travel a selected path, for example, to distribute and collect mail within an office building, or to distribute to or transfer parts between work stations in a factory. Such automatic guided vehicles (AGV's) generally use a guide wire buried in the floor which carries an AC signal to be sensed by the AGV. This wire guided approach is undesirable in situations where the AC signal could interfere with adjacent equipment, such as in factories manufacturing or testing delicate electronics equipment, and in situations where it is not easy to retrofit an existing floor with a buried wire.

Another approach involves using a fluorescent paint to define a path for the AGV. While the use of a path painted or otherwise applied on the floor surface has clear advantages over a buried wire, a suitable control system must be devised. With any system utilizing a path marked on the floor, the control system must be able to detect the path and determine the lateral position of the AGV relative to the path, and able to provide an appropriate guidance signal to the AGV steering/propulsion system indicative of the lateral directional position and distance of the AGV relative to the path.

The present invention provides a control system for an AGV which utilizes minimal hardware while providing improved lateral position control, and emitting no electrical radiation such as produced by guidance signals emanating from a wire embedding in the floor. Moreover, the present invention provides a means for easy change of the path layout to accommodate changes in office and factory needs, and provides other advantages.

DISCLOSURE OF THE INVENTION

The present invention resides in a control system for guiding a vehicle over a floor. The control system includes a narrow length of reflective material applied to the floor to define a desired path for the vehicle to travel along, means for generating light and directing the light toward the reflective material, and a generally linear array of light sensors mountable on the vehicle generally transverse to the length of reflective material. Each sensor has a field of view and generates an output signal generally proportional to the portion of the sensors' field of view occupied by the reflective material.

The control system further includes a means for generating a reference signal with an amplitude generally unidirectionally and progressively changing over a preselected period of time, and means for comparing each of the sensor output signals to the reference signal during the preselected time period and generating a binary output signal for each of the sensors. The binary output signal is indicative of whether the amplitude of the sensor output signal is above or below the reference signal.

Means are also provided for sampling the value of each of the sensor binary output signals on a plurality of sampling occasions during the preselected time period, and combining the sampled values of the sensor binary output signals for each sampling occasion to derive a position indicating value therefrom. In a presently preferred embodiment, the binary output signals for each sampling occasion are combined in a predetermined order to generate a byte. The byte is indicative of the lateral position of the sensor array relative to the reflective material at the time of the sampling occasion based upon the changing threshold provided by the reference signal.

The control system further has summing means for mathematically summing all of the position indicating values for the one preselected time period and generating a vehicle command. The vehicle command comprises a vehicle lateral directional command to command the direction of lateral movement of the vehicle as it travels along the path, and a vehicle lateral displacement command to control the amount of lateral movement of the vehicle.

In the presently preferred embodiment of the invention, each of the bytes generated during the one preselected time period correspond to a table location value, and a lookup table stores a plurality of the position indicating values. Each position indicating value is stored at a table location corresponding to one of the table location values. Each of the position indicating command to control the direction of the lateral movement of the vehicle and an interim vehicle lateral displacement command to control the amount of lateral movement of the vehicle. The interim vehicle directional and displacement commands are based upon the lateral position of the sensor array relative to the reflective material at the time of the sampling occasion corresponding to the one byte as measured using the changing threshold provided by the reference signal. The control system has lookup means for looking up the ones of the position indicating values stored in the lookup table at the table locations corresponding to the table location values, which in turn correspond to the bytes generated for the one preselected time period.

Again in the preferred embodiment, the lookup table includes a first table storing a first plurality of the position indicating values, with each comprising interim vehicle directional and displacement commands directing the vehicle to follow the left edge of the reflective material. The lookup table further includes a second table storing a second plurality of the position indicating values, with each comprising interim vehicle directional and displacement commands directing the vehicle to follow the right edge of the reflective material.

The reference signal is a generally ramped signal, and in the preferred embodiment, the ramped reference signal is a stair-step signal. The reference signal means includes clock means for generating a clock signal, counter means for counting the clock signals up to a predetermined number during each of the preselected time periods and generating count indicating signals, and summing means for summing the count indicating signals and therefrom generating the stair-step signal.

Other features and advantages of the invention will become apparent from the following detailed description taken in conjunction with the accompanying drawings.

BEST MODE FOR CARRYING OUT THE INVENTION

Figures 1, 2:
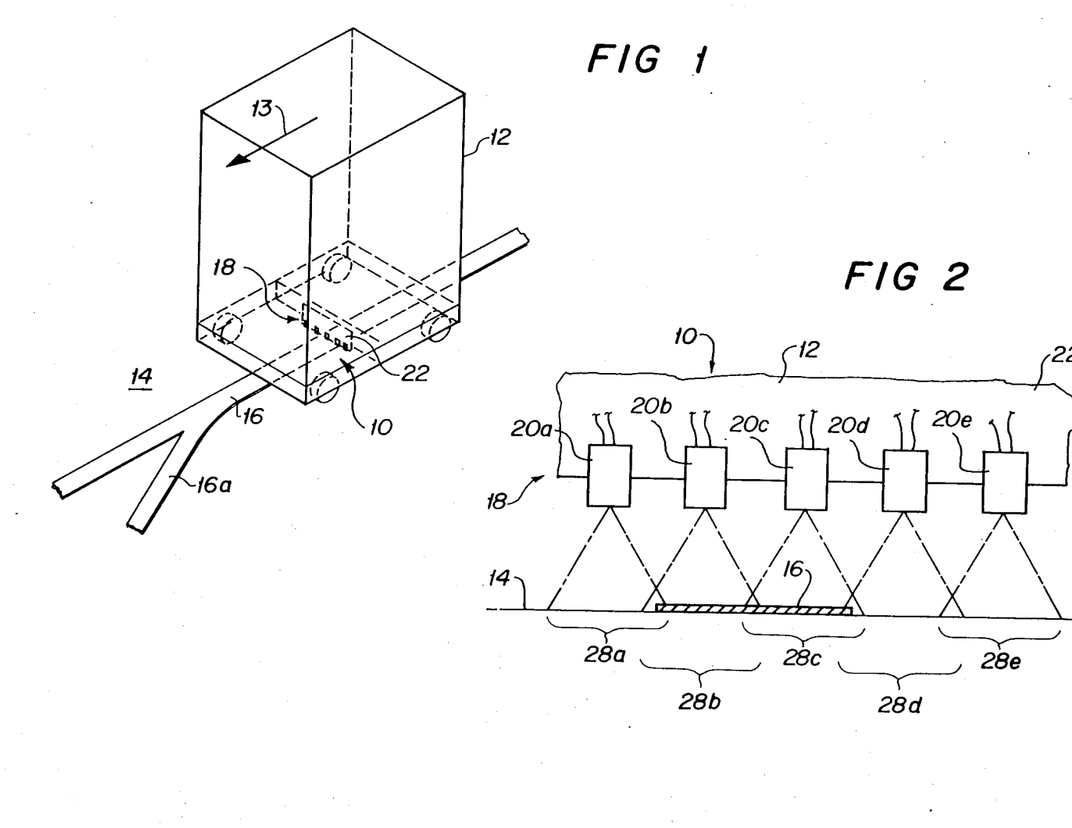
FIG. 1 is an isometric view of a vehicle embodying the control system of the present invention shown in position over a path made of retroreflective tape applied to a floor.
FIG. 2 is an enlarged, fragmentary front elevational view of a sensor array utilized by the control system, showing the retroreflective tape in cross-section positioned within the field of view of three of the sensors.

As shown in the drawings for purposes of illustration, the invention is embodied in a control system indicated generally by the reference numeral 10, for guiding a wheeled vehicle 12, which includes a steering mechanism and a self contained propulsion system (not shown), over a substantially planar floor 14, such as a concrete or tile floor in an office or factory (see FIG. 1). The control system 10 utilizes a narrow length of reflective material, such as a length of retroreflective one-sided adhesive tape 16, applied to the floor 14 to define a desired path for the vehicle 12 to travel along. The direction of forward motion for the vehicle 12 is shown by the arrow 13.

As best shown in FIG. 2, the control system 10 includes a generally linear array of reflective light sensors, indicated generally by reference numeral 18, mounted on the vehicle 12 so as to be generally transverse to the length of retroreflective tape 16 as the vehicle travels along the path. In the preferred embodiment, the sensor array includes a row of five spaced apart reflective sensors 20, identified in FIG. 2 as sensors 20a, 20b, 20c, 20d and 20e. The sensors 20a-e are mounted in a row on the lower edge of a mounting circuit board 22 attached to the under carriage of the vehicle.

Figure 4:
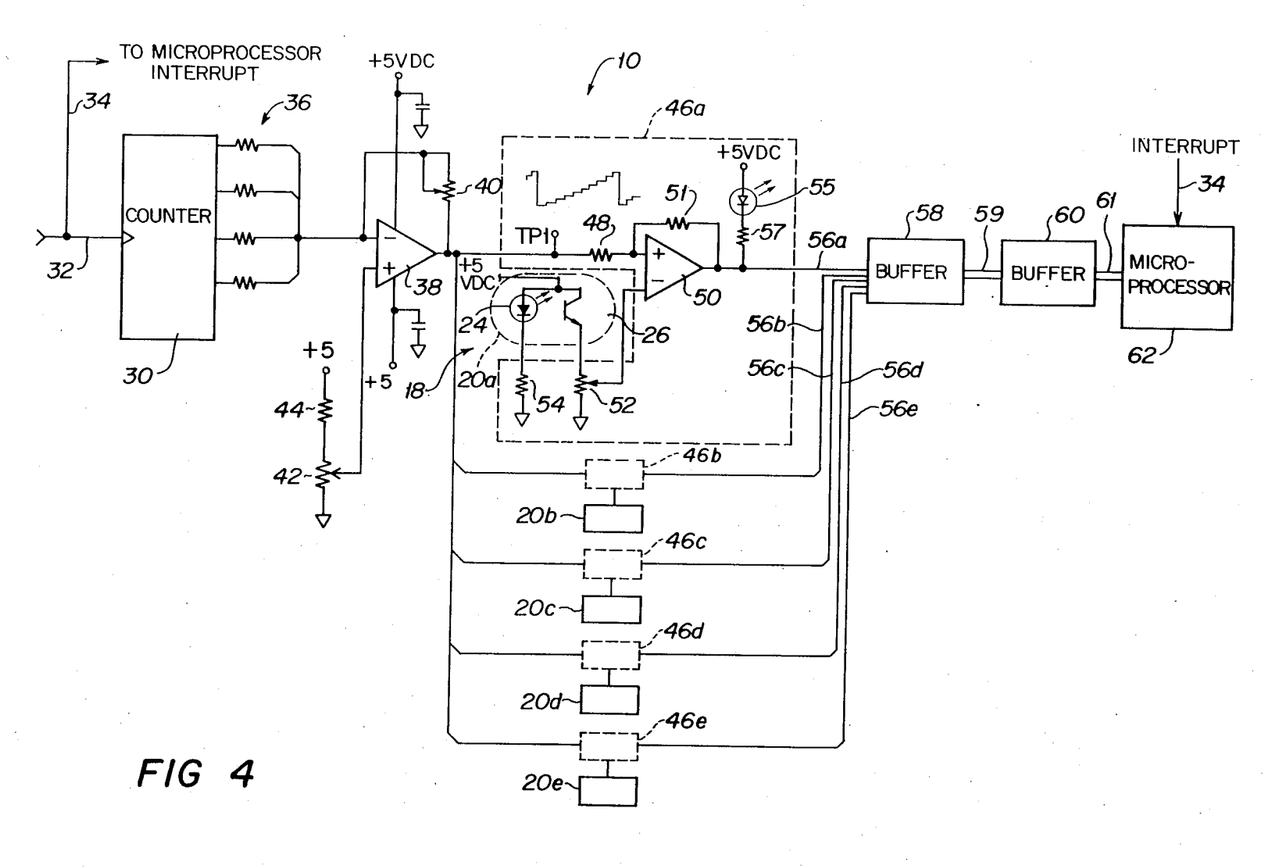
FIG. 4 is an electrical schematic drawing of the control system of the present invention, and includes the detailed circuitry of one of the five comparator circuits used with the present invention.

As illustrated in the schematic drawing of FIG. 4 for sensor 20a, the reflective sensors 20a-e each include an infrared light emitting diode (LED) 24 positioned to focus its infrared light output directly downward toward the floor 14 therebelow. The reflective sensors also each include an adjacently positioned phototransistor 26 aimed directly downward toward the floor 16 to receive any infrared light produced by the LED 24 which is reflected upward from the retroreflective tape 16. In the preferred embodiment, the reflective sensors 20a-e are positioned above the floor 16 a sufficient height to provide slightly overlapping fields of view, indicated by reference numbers 28a, 28b, 28c, 28d and 28e, respectively.

It is noted that the reflective sensors 20a-e are conventional sensors which each include one LED and one phototransistor pre-packaged together.

In the preferred embodiment, the reflective sensors 20a-e are mounted on the circuit board 22 on 0.5 inch centers, and at a height to provide a field of view at the floor level of approximately 0.5 inches in diameter. The retroreflective tape 16 in the preferred embodiment is 1.0 inches in width, and applied directly to the floor to provide an easily installed path. It is noted that by utilizing adhesive tape, the path can be conveniently modified as needs require by simply lifting the tape and re-applying the tape or by applying new tape to the floor to define the new path. In addition, the existing path may be conveniently altered by simply adding new tape branches and loops, such as by adding a Y-branch as shown in FIG. 1, which the vehicle 12 can selectively travel. As will be described in more detail below, the control system 10 can be programmed in advance or during operation to follow a particular path, and the left or right edge of the tape 16.

To improve the control provided by the control system 10 over the motion of the vehicle 12, the present invention does not merely sense the presence or absence of the tape below each of the reflective sensors 20a-e to determine the position of the sensor array 18 relative to the reflective tape 16. With the invention, it is possible to effectively interpolate the position of the reflective tape 16 between the reflective sensors 20a-e with a minimum of hardware, and provide a tape location resolution far greater than possible by merely using each of the sensors to simply indicate the presence or absence of the reflective tape in the sensor's field of view. It is noted that if the sensors were used only to indicate the presence or absence of the reflective tape, the position of the tape could only be located within a variance of approximately plus or minus the spacing of the sensors. While reducing the field of view of the sensors would increase the resolution somewhat, more sensors would be required to function properly, thus adding to the expense and complexity of the control system.

Figure 7:
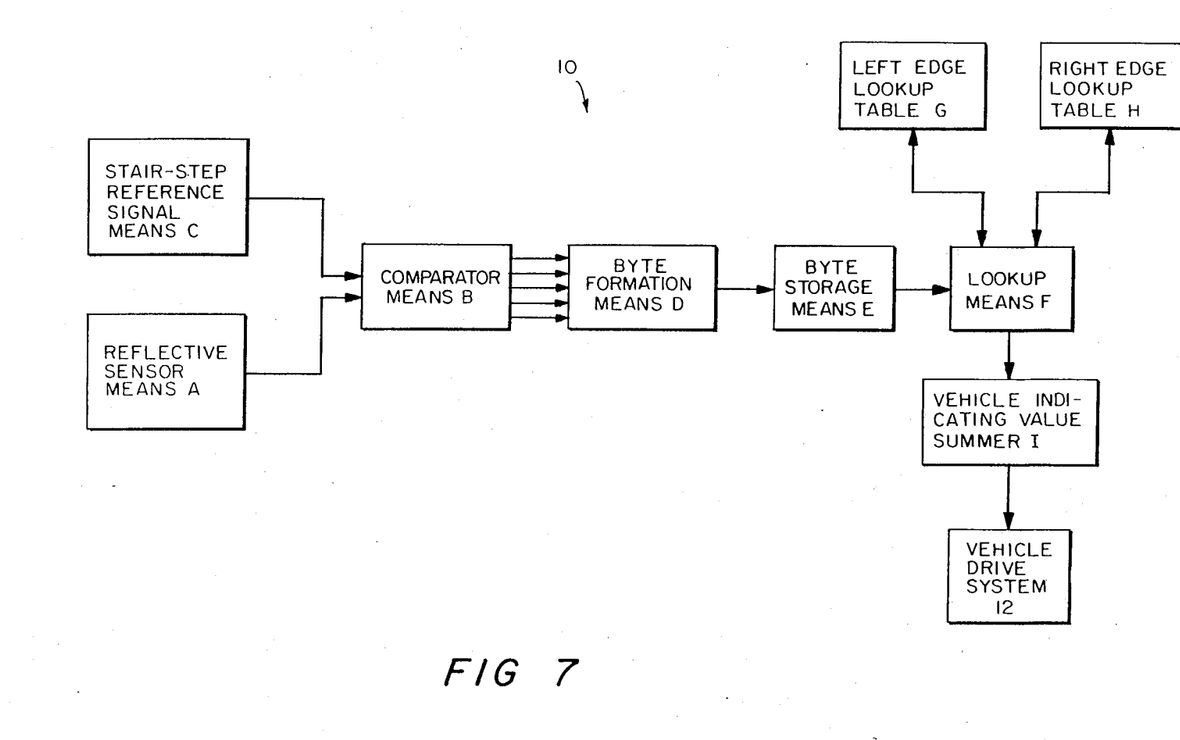
FIG. 7 is a functional block diagram illustrating the overall operation of the control system of the present invention.

A functional block diagram illustrating the overall operation of the control system 10 of the present invention is shown in FIG. 7. A reflective sensor means "A", which includes the linear array of reflective sensors 20a-e, simultaneously provides five analog output signals proportional to the percentage of the field of view of the sensors that is occupied by the reflective tape 16. The signals are provided to a comparator means "B". The comparator means compares each of the output signals to a stair-step reference voltage signal $V_{ss}$ generated by a stair-step reference signal means "C". The reference signal has a 10 millisecond period, and a comparison is made once each millisecond of each of the five sensor output signals with the reference signal. If at a sampling occasion a sensor's output signal is above the reference signal, the output of the comparator means for that output signal will be a binary "0". Should the progressively increasing stair-step reference signal increase to a level above the sensor's output signal at the next sampling occasion, the output of the comparator means for that output signal will change to a binary "1".

On each of the ten sampling occasions during the 10 millisecond period for the reference signal, the five outputs of the comparator means are combined to form a 5 bit byte by a byte formation means "D". Each of the bytes formed during a 10 millisecond period is stored by a byte storage means "E" for later processing. The mathematical value of each byte represents a unique value which corresponds to the lateral position of the sensor array 18 relative to the reflective tape 16, and the value is dependent upon the changing voltage threshold level of the reference signal.

After the 10 millisecond period is completed, the mathematical value for each of the 10 bytes generated during the period is used as a table location value by a lookup means "F". The lookup means, based upon the value of each byte, will determine a vehicle indicating value stored in one of two lookup Tables 37 G" or "H". The table "G" contains vehicle indicating values which comprise an interim or partial command to control the direction of lateral movement of the vehicle 12 and the amount of lateral movement of the vehicle necessary for the vehicle to track the center of the reflective tape 16 while following the left edge of the tape. The table "H" contains similar vehicle indicating values, except that they are provided for following the right edge of the tape. Left or right edge tracking may be preselected.

After the 10 bytes generated for a particular 10 millisecond period are used to read the 10 corresponding vehicle indicating values from either the left or right edge lookup table, the 10 vehicle indicating values are mathematically summed by a vehicle indicating value summer "I" to generate a final vehicle command which is supplied to the vehicle drive system of the vehicle 12. The final vehicle command is used to accurately control the direction and amount of lateral movement of the vehicle. The control system 10 comprising the present invention will now be described in more detail, and several examples of operation of the system will be provided.

The reflective sensors 20a–e used with the present invention each have an output current signal which is approximately proportional to the percentage of the field of view of the sensor that is occupied by the reflective tape 16. As will be described in more detail below, this sensor output current signal is effectively digitized to a value between 0 and 10, inclusive, to increase the resolution of the sensor array 18 by a factor of up to 10.

As best shown in FIG. 4, to digitize the output current signal of the reflective sensors 20a–e, a divide-by-ten counter 30 is used which operates from a 1.0 KHz (kilohertz) square wave input signal on input line 32. As will be described below, this signal is also provided on an interrupt line 34 to provide a microprocessor interrupt signal which causes the digitized sensor output signals to be sampled once each millisecond for ten samplings over a 10 millisecond period. The four parallel outputs of the counter 30 are each connected in parallel through one of four binary weighted resistors 36 to the negative input of an operational amplifier 38. The output of the operation amplifier 38 is connected back to the negative input by a variable resistor 40 which provides a gain adjustment to calibrate the voltage level of the output signal of the operational amplifier. The positive input of the operational amplifier 38 is connected to the wiper arm of another variable resistor 42. The resistor 42 is connected in series with a resistor 44 between +5 VDC and ground to provide an offset voltage for calibrating the operational amplifier 38.

Figure 3:
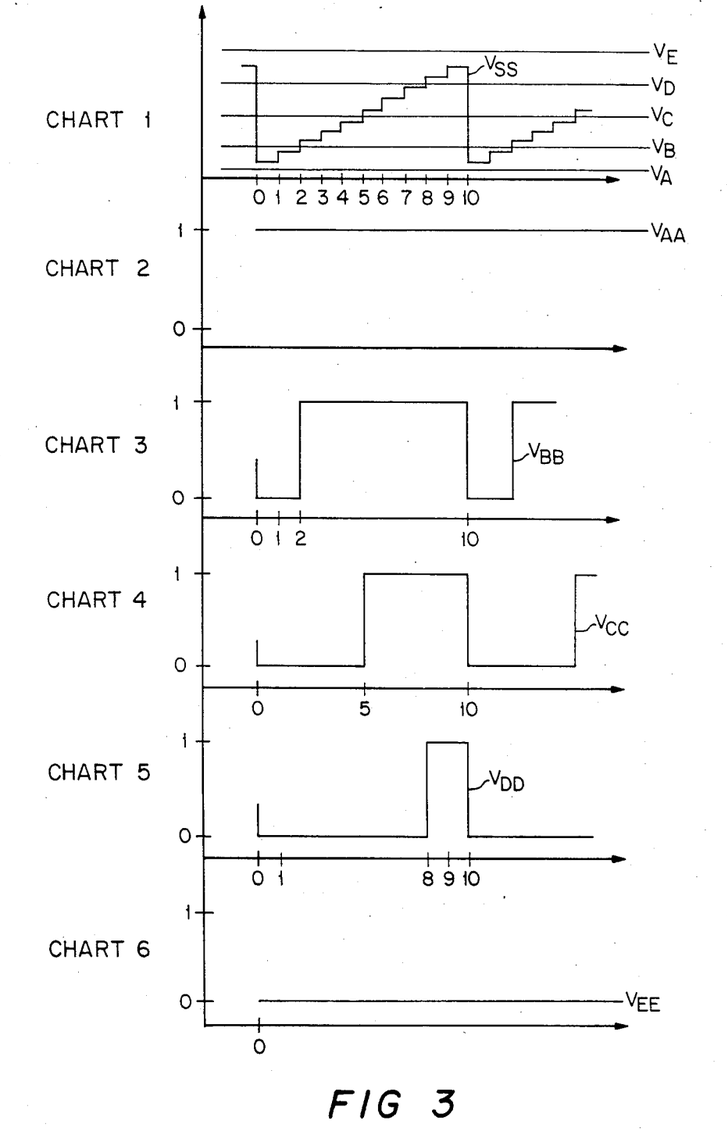
FIG. 3 is a collection of waveform charts demonstrating the various sensor output signals.

The counter 30 and the operational amplifier 38 in combination generate the stair-step voltage reference signal $V_{ss}$ having a 10 millisecond period on the output of the operational amplifier 38, as shown in waveform Chart 1 of FIG. 3. The stair-step signal $V_{ss}$ on the output of the operational amplifier 38 produced at test point TP1 of FIG. 4 has 10 steps at progressively decreasing voltage levels with each step having a duration of 1 millisecond. It is noted that while the stair-step signal $V_{ss}$ is shown and described herein as being progressively increasing for ease of understanding, the embodiment of the circuit disclosed in FIG. 4 actually utilizes existing utilize a progressively decreasing stair-step signal. As described above, the circuitry of FIG. 4 has the four parallel outputs of the counter 30 each connected in parallel through one of the four binary weighted resistors 36 to the negative input of the operational amplifier 38, thus producing a progressively decreasing reference signal which is the inverse of the progressively increasing stair-step signal $V_{ss}$ shown and described as such for ease of understanding. Either may be used and the invention is intended to cover the use of both an increasing and decreasing reference signal.

The stair-step signal $V_{ss}$ is used as a reference voltage for each of five comparator circuits, each comparator circuit being indicated in FIG. 4 by reference numerals 46a, 46b, 46c, 46d, and 46e which correspond, respectively, to the reflective sensors 20a–e. One comparator circuit is used with each reflective sensor. For brevity, only the comparator circuit 46a and the reflective sensor 20a are shown in detail in FIG. 4 and will be described herein, but all five comparator circuits and reflective sensors are identical in design and function.

The stair-step signal $V_{ss}$ provided on the output of operational amplifier 38 is connected through an input resistor 48 to the positive input of an operational amplifier 50. A feedback resistor 51 is provided between the positive input and the output of the operational amplifier 50 to supply hysteresis. The emitter of the phototransistor 26 of the reflective sensor 20a is connected to ground through a variable resistor 52, and the wiper arm of the variable resistor 52 is connected to the negative input of the operational amplifier 50. The cathode of the LED 24 of the reflective sensor 20a is connected to ground through a resistor 54. The anode of the LED 24 and the collector of the phototransistor 26 are connected to +5 VDC.

The operational amplifier 50 serves as a comparator and compares the voltage level of the stair-step signal $V_{ss}$ to the analog voltage level of the voltage on the wiper arm of resistor 52, which is directly dependent upon the output current signal produced by the phototransistor 26 of the reflective sensor 20a. As previously mentioned, the current produced by the phototransistor 26 is approximately proportional to the percentage of the field of view of the sensor that is occupied by the retroreflective tape 16. By use of a variable resistor for the resistor 52, a means is provided for calibrating the analog voltage level provided on the negative input of the operational amplifier 50 by the reflective sensor 20a.

The output signal of the operational amplifier 50 is a binary signal with a positive pulse duration dependent upon the level of the analog voltage on the wiper arm of the resistor 52 and applied to the negative input of the operational amplifier. This analog voltage level is itself dependent upon the amount of light detected by the phototransistor 26 of the reflective sensor 20a, and hence upon the percentage of the field of view of the sensor occupied by the retroreflective tape 16. By way of example, a number of possible analog voltage levels $V_A$, $V_B$, $V_C$, $V_D$ and, $V_E$ produced by the reflective sensor 20a on the negative input of the operational amplifier 50 are shown in Chart 1 of FIG. 3. Analog voltage level $V_A$ corresponds to the retroreflective tape 16 being totally out of the field of view of the reflective sensor 16, and levels $V_B$-$V_E$ correspond to the tape being increasingly within the field of view of the sensor, with level $V_E$ being produced when the tape is fully within the sensor's field of view. Waveform Charts 2-6 illustrate the respective output signals $V_{AA}$-$V_{EE}$ of the operational amplifier 50 which are produced by the analog voltage levels $V_A$-$V_E$ of Chart 1.

The output of the operational amplifier 50 is connected to the cathode of a light emitting diode (LED) 55 which has its anode connected to +5 VDC through a current limiting resistor 57, and produces light visible to the naked eye. Each of the comparator circuits 46a-e is provided with such an LED and the LEDs are arranged in a row corresponding to the in-row arrangement of the reflective sensors 20a-e and mounted at a location for easy viewing by a person inspecting operation of the vehicle's control system 10. During the time the output signal on the operational amplifier 50 is low (binary "0"), the diode will emit visible light, thus giving some indication to the viewer of the relative position of the corresponding reflective sensor to the tape 16. Of course, the LED 55 will flicker if the output signal is not continuously on or off, as described below, as occurs when the tape 16 is not fully within or fully without the field of view of the sensor.

When adjusted properly and as shown in Chart 2 of FIG. 3, the output signal $V_{AA}$ of the operational amplifier 50 will be a continuous high (binary "1") for the entire 10 millisecond period of the stair-step signal $V_{SS}$ when the retroreflective tape 16 is not within the field of view of the reflective sensor 20a, with only a nonretroreflective material such as a floor within the field of view. This is because the analog voltage level $V_A$ on the negative input of the operational amplifier 50 of the comparator circuit 46a is at all times less than the stair-step signal $V_{SS}$.

At the opposite extreme, as shown in Chart 6, the output signal $V_{EE}$ of the operational amplifier 50 will be a continuous low (binary "0") for the entire 10 millisecond period of the stair-step signal $V_{ss}$ when the retroreflective tape 16 is directly below the reflective sensor 20a and fully within the field of view of the sensor. This is because the analog voltage level $V_E$ on the negative input of the operational amplifier 50 of the comparator circuit 46a is at all times greater than the stair-step signal $V_{ss}$.

When the retroreflective tape 16 is partially within the field of view of the reflective sensor 20a, such is the case when one edge of the tape is beneath the sensor, the output signal of the operational amplifier during the 10 millisecond period will be initially low (binary "0"), and then go high (binary "1") for the remainder of the 10 milliseconds, with the change in state occurring at the time the stair-step signal $V_{ss}$ crosses over the analog voltage level on the negative input of the operational amplifier 50. This is illustrated in Charts 3-5 of FIG. 3 for the analog voltage levels $V_B$-$V_D$ shown in Chart 1. As can be readily seen, the duration of the low and high pulse portions of the output signal of the operational amplifier 50 is dependent upon the percentage of the field of view of the reflective sensor 20a occupied by the reflective tape 16, with the more the retroreflective tape 16 is within the field of view of the sensor, the greater the duration of the low pulse portion (binary "0") on the output of the operational amplifier 50. With the present invention, the reflective sensors 20a-e are used not only to indicate the presence or absence of the reflective tape 16 in their respective fields of view 28a-e, but also, in conjunction with the changing reference provided by the stair-step signal $V_{ss}$ and the comparator circuits 46a-e, to detect how much of the tape is within the field of view of each sensor.

The output signal of the operational amplifier 50 constitutes the output signal of the comparator circuit 46a, and in the same fashion discussed above, each of the other comparator circuits 46b-e for the other four reflective sensors 20b-e are simultaneously producing an output signal indicative of the percentage of the field of view of the respective sensor which is occupied by the reflective tape 16. As will be described below, the output signal of each comparator circuit is sampled at 10 occasions during the 10 millisecond period and processed to provide the improved control system of the present invention.

As noted above, each of the reflective sensors 20a-e is incorporated into its respective comparator circuit 46a-e, and in conjunction with a corresponding operational amplifier 50 for that comparator circuit, produces a binary "1" or "0" output signal on comparator circuit output lines 56a, 56b, 56c, 56d and 56e, respectively. The comparator circuit output lines 56a-e are connected to the parallel input ports of a bus chip buffer 58. The five binary output signals are provided via a parallel bus 59 to a bus transceiver/buffer 60, and then via a parallel bus 61 to a microprocessor 62. While the binary output signal of each of the comparator circuits 46a-e is provided at all times to the microprocessor 62, the sampling of the signals by the microprocessor is controlled by the interrupt line 34 operating off the 1 KHz input signal. As such, the microprocessor 62 simultaneously samples each of the five binary output signals of the comparator circuits 46a-e once each millisecond to generate a byte containing five bits with the binary values of the comparator circuit output signals.

The byte is formed with the binary output signal of the comparator circuit 46a being the most significant bit, the binary output signal of the comparator circuit 46b being the next most significant bit, and so on with the binary output of the comparator circuit 46e being the least significant bit. The byte generated by the microprocessor 62 reading the binary output signals of the comparator circuits 46a-e is then stored for further processing. As will be discussed below, the mathematical value of each byte is indicative of the lateral position of the sensor array 18 relative to the reflective tape 16.

The microprocessor 62 operates on a 10 millisecond, 10 byte cycle synchronized with the 10 millisecond period of the stair-step signal $V_{ss}$. Once each millisecond during the period the five output signals of the comparator circuits 46a-e are sampled in order to generate 10 separate bytes. The mathematical value of the byte generated on each sampling occasion is dependent upon the changing voltage threshold level of the stair-step signal $V_{ss}$, as will be demonstrated using FIGS. 5 and 6, and represents a unique value which corresponds to the lateral position of the sensor array 18 relative to the reflective tape 16 for the state of the changing reference provided by the stair-step signal $V_{ss}$. This unique value corresponds to a unique lateral control command for the vehicle 12, which as will be described below is stored in one of two lookup tables. Each of the 10 bytes generated during one 10 millisecond period is referred to as a table location value. For ease of understanding, these table location values will be represented as decimal system base number-10 values, although the microprocessor 62 operates in binary and no such conversion actually occurs.

Figure 5A:
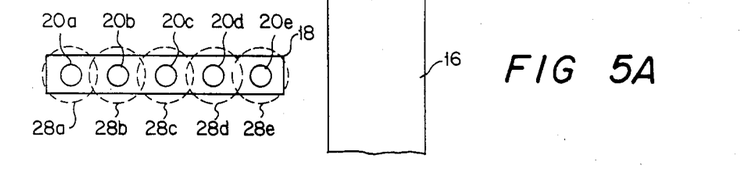
FIGS. 5a-5f are schematic representations of five example positions for the sensor array relative to the retroreflective tape for purposes of illustrating operation of the invention.
Figure 5B:
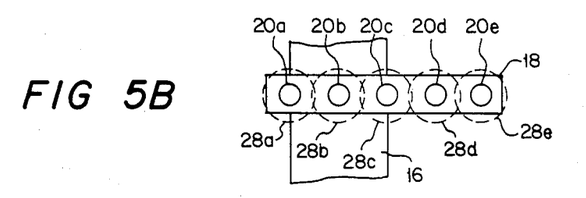

In the first example shown in FIG. 5a, the sensor array 18 of the vehicle 12 is shown positioned to the left side of the retroreflective tape 16. The tape is not within the fields of view 28a-e of any of the reflective sensors 20a-e during any of the ten sampling occasions during the 10 millisecond example period.

Figure 6A:
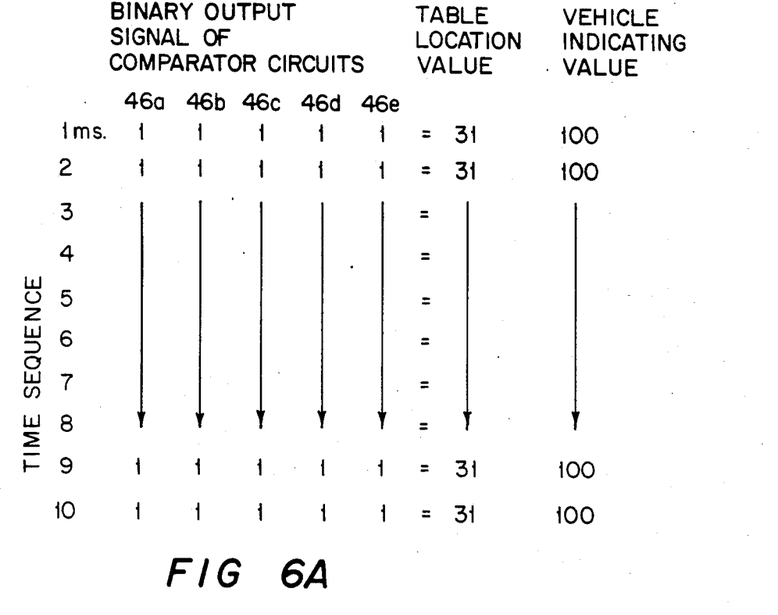
FIGS. 6a-6e contain the data tables which correspond to the five examples contained in FIGS. 5a-5e.
Figure 6B:
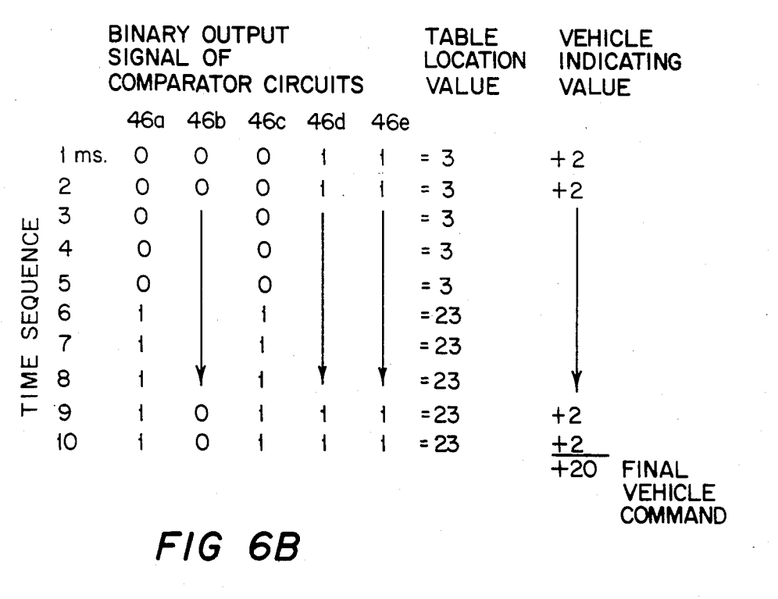

As shown in the corresponding data table of FIG. 6a, which presents the 10 bytes produced during the 10 millisecond example period in table form, the outputs of every comparator circuit 46a-e corresponding to the reflective sensors 20a-e is binary "1" for the first sampling occasion, as well as for each of the 9 additional sampling occasions during the 10 millisecond period. The byte generated for each sampling occasion is thus "11111". The mathematical value of the byte for the first sampling occasion, converted into an equivalent base number-10 table location value for ease of understanding, is the number "31". The table location value for each of the other 9 additional sampling occasions is also "31". Referring back to FIG. 3, since the retroreflective tape 16 in this example is not within the field of view of the reflective sensors 20a-e, the analog voltage level applied to the negative input of each of the operational amplifiers 50 for the comparator circuits 46a-e is the voltage level $V_A$ shown in Chart 1 of FIG. 3, and the comparator circuit output signal for each of the comparator circuits is a continuous high (binary "1") for the entire 10 millisecond period, as shown by the output signal $V_{AA}$ in Chart 2 of FIG. 3.

Each of the table location values corresponds to a location in one of a pair of lookup tables, shown in Tables 7a and 7b, below.

TABLE 7a

| Table Location Value | Vehicle Indicating Value (Left) |
|---|---|
| 0 | +4 |
| 1 | +4 |
| 2 | +4 |
| 3 | +2 |
| 4 | +4 |
| 5 | +4 |
| 6 | +4 |
| 7 | +3 |
| 8 | +4 |
| 9 | +4 |
| 10 | +4 |
| 11 | +4 |
| 12 | +4 |
| 13 | +4 |
| 14 | +4 |
| 15 | +4 |
| 16 | +1 |
| 17 | 0 |
| 18 | +1 |
| 19 | +1 |
| 20 | +2 |
| 21 | +2 |
| 22 | +2 |
| 23 | +2 |
| 24 | −1 |
| 25 | −1 |
| 26 | 0 |
| 27 | 0 |
| 28 | −3 |
| 29 | −2 |
| 30 | −4 |
| 31 | 100 |

TABLE 7b

| Table Location Value | Vehicle Indicating Value (Right) |
|---|---|
| 0 | −4 |
| 1 | −1 |
| 2 | −4 |
| 3 | +1 |
| 4 | −4 |
| 5 | −2 |
| 6 | −4 |
| 7 | +3 |
| 8 | −4 |
| 9 | −1 |
| 10 | −4 |
| 11 | 0 |
| 12 | −4 |
| 13 | −2 |
| 14 | −4 |
| 15 | +4 |
| 16 | −4 |
| 17 | 0 |
| 18 | −4 |
| 19 | +1 |
| 20 | −4 |
| 21 | −2 |
| 22 | −4 |
| 23 | +2 |
| 24 | −2 |
| 25 | −1 |
| 26 | −4 |
| 27 | 0 |
| 28 | −3 |
| 29 | −2 |
| 30 | −4 |
| 31 | 100 |

The first lookup table, shown in Table 7a, is for use when it is desired to have the control system 10 follow the left edge of the retroreflective tape 16, and the second lookup Table, shown in Table 7b, is for use when it is desired to follow the right edge of the tape. Each of the lookup tables contains at each table location therein (which corresponds to one of the table location values) a vehicle indicating value which comprises an interim or partial command to control the direction of lateral movement of the vehicle 12 and the amount of lateral movement of the vehicle necessary for the vehicle to track the center of the retroreflective tape 16 while following either the left or right edge of the tape corresponding to the table used.

After the 10 bytes are generated by the microprocessor 62 for a particular 10 millisecond period, the corresponding 10 table location values are used to read the 10 corresponding vehicle indicating values from the desired left or right edge lookup Table 7a or 7b. It is noted that while each table location value corresponds to an indicating value which includes an interim command to control the direction of lateral movement and amount of lateral movement of the vehicle 12, a single interim command cannot be used by itself to control the movement of the vehicle 12 if it is desired to realize the increased resolution of the control system 10 of the present invention. Rather the vehicle indicating values corresponding to each of the 10 table location values for the 10 millisecond period must be mathematically summed together to generate a final vehicle command which can be used to accurately control the direction and amount of lateral movement of the vehicle. This is because the bytes which were converted to indicate which of the individual interim commands to read from the table are a result of comparing the analog voltage levels produced by the reflective sensors 20a-e to a changing voltage threshold supplied by the stair-step signal $V_{ss}$. The summation of the 10 vehicle indicating values produces the interpolation effect which provides the increased resolution of the present invention.

Referring again to the data table of FIG. 6.a which corresponds to the sensor array 18 being located completely to the left of the retroreflective tape 16, as shown in FIG. 5.a, the table location value for each of the 10 bytes during the 10 millisecond period is "31". To determine the vehicle indicating value for each table location value from the left edge lookup Table 7a in order to follow the left edge of the retroreflective tape 16, the microprocessor 62 reads the vehicle indicating value stored at location "31" of the table, which is the value "100". The vehicle indicating value "100" is an arbitrary value selected as an internal flag indicating that the vehicle 12 is not over the retroreflective tape 16, and that appropriate action should be taken to either search for the tape or stop all movement of the vehicle for safety reasons. In an attempt to briefly search for the tape, a vehicle indicating value of "+4" or "−4" is initially substituted for the value "100" to produce a maximum left or right vehicle command, in a manner which will be described in more detail below. It is noted that the outputs of the comparator circuits 46a–e. and hence the resulting bytes would be the same if the sensor array 18 was located completely off the tape to the right side, thus the same flag values would be realized. Whether positive or negative values are used for the substitution depends upon the correctional direction the vehicle was being instructed to travel prior to going completely off the tape. In any event, if the tape is not quickly found, the vehicle will be instructed to stop.

For purposes of illustration, five additional examples are shown in FIGS. 5.b–5.f with the sensor array 18 at a variety of lateral positions relative to the longitudinal center line of the retroreflective tape 16. The bytes produced as a result of the 10 sampling occasions during each of the 10 milliseconds example period are shown in corresponding data tables in FIGS. 6.b–6.f, respectively. For brevity, only the example in FIG. 5.c will be described in detail. In the example of FIG. 5.c, the sensor array 18 is shown with the reflective sensor 20b positioned slightly to the left of the center of the retroreflective tape 16. In this position, the field of view 28b of the reflective sensor 20b is fully occupied by the retroreflective tape 16, and the output voltage signal for the sensor 20b is as shown by analog voltage level $V_E$ in Chart 1 of FIG. 3, and hence the output signal of the comparator circuit 46b is a continuous low for the entire 10 millisecond period, as shown by output signal $V_{EE}$ in Chart 6 of FIG. 3. As shown in the corresponding data table of FIG. 6.c, the second most significant bit of the byte generated based on the sensor 20b will be a binary "0" during each of the 10 sampling occasions during the 10 millisecond period.

Figure 6C:
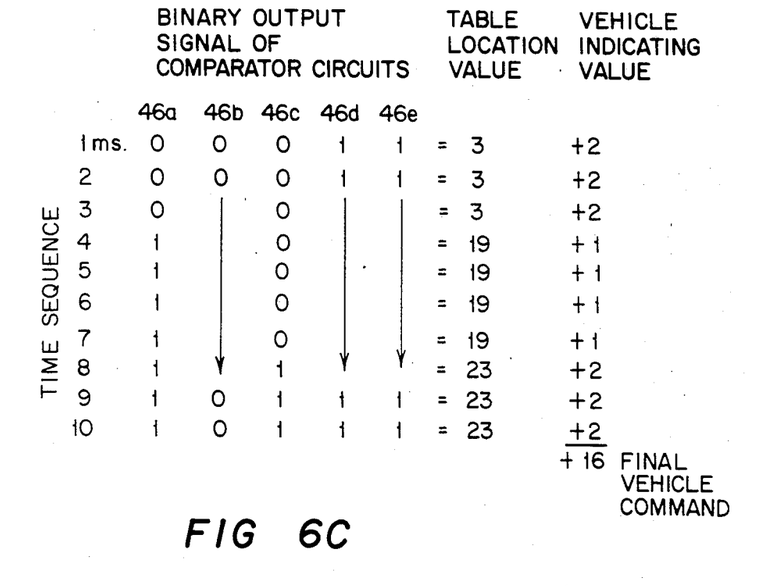
Figure 6D:
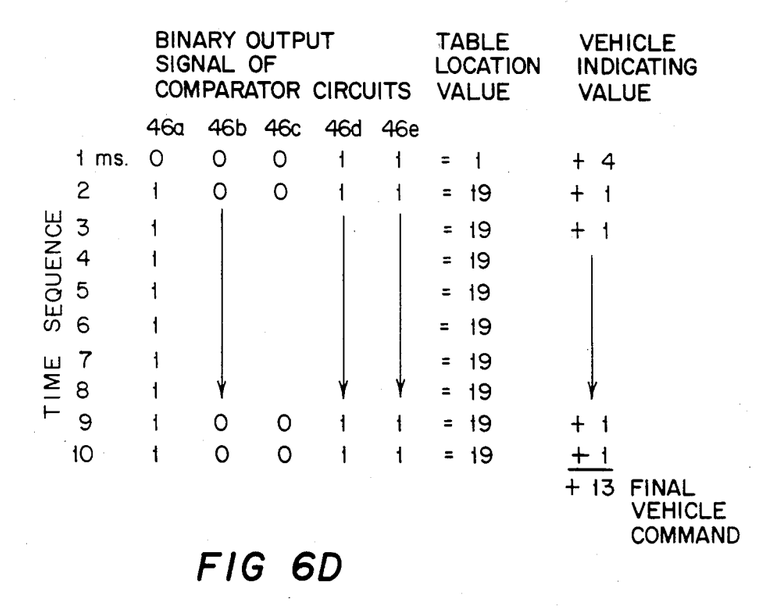
Figure 6E:
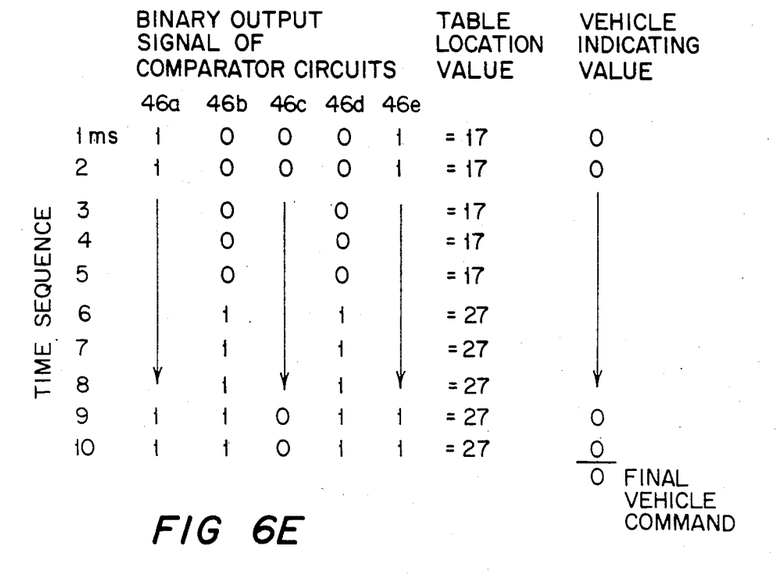
Figure 6F:
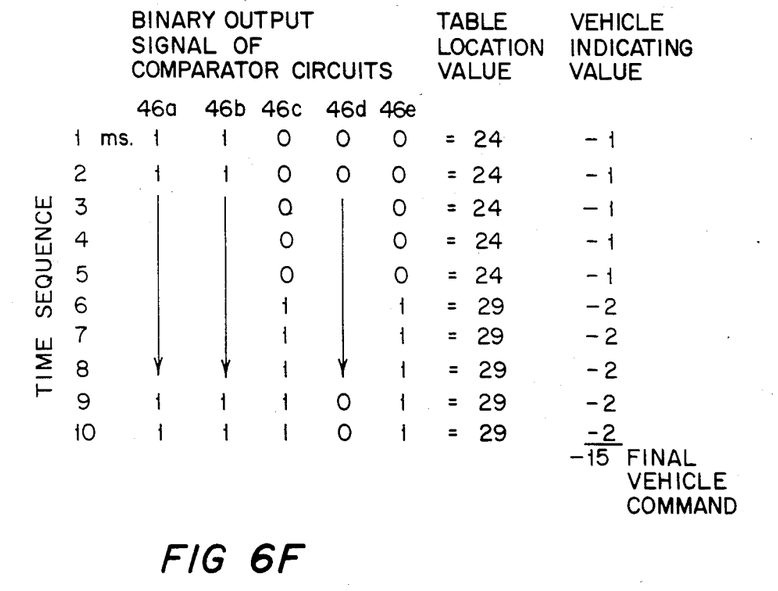

This is to be compared with sensors 20d and 20e, which are completely off to the right of the retroreflective tape 16 and the fields of view 28d and 28e of the sensors 20d and 20e are not occupied at all by the retroreflective tape. As with the first described example of FIG. 5.a where all sensors were off the tape, the output voltage signal will be at the analog voltage level $V_A$ in Chart 1 of FIG. 3, and the output signal of the corresponding comparator circuits 46d and 46e will be a continuous high for the entire 10 millisecond period, as shown by output signal $V_{AA}$ in Chart 2 of FIG. 3. As shown in the data table of FIG. 6.c, the two right most bits of the byte generated based on the sensors 20d and 20e will be a binary "1" during each of the 10 sampling occasions during the 10 millisecond period.

The situation is significantly different for sensors 20a and 20c since the left and right edges of the retroreflective tape 16 are within their respective fields of view 28a and 28c, with the tape edge being positioned between the sensor and the next adjacent sensor. As such, the output voltage signals of the sensors 20a and 20c will be somewhere between the extremes of the analog voltage levels $V_A$ and $V_E$ in Chart 1 of FIG. 3. Since reflective sensor 20a has less than one-half of its field of view 28a occupied by the retroreflective tape 16, the output voltage signal will be at about the analog voltage level $V_B$ in Chart 1 of FIG. 3. Since reflective sensor 20c has more than one-half of its field of view 28c occupied by the tape 16, the output voltage signal will be at about the analog voltage level $V_D$ shown in Chart 1 of FIG. 3. As such, the output signal of the corresponding comparator circuits 46a and 46c will be as shown by the output signals $V_{BB}$ and $V_{DD}$, respectively, in Charts 3 and 5 of FIG. 3. Each has an initial low signal portion (binary "0") and a high signal portion (binary "1") for the remaining time of the 10 millisecond period.

Figure 5C:
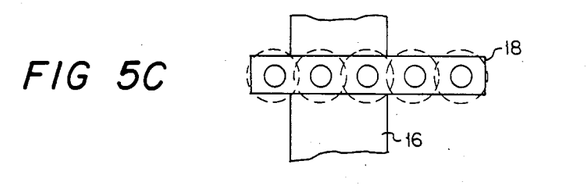
Figure 5D:
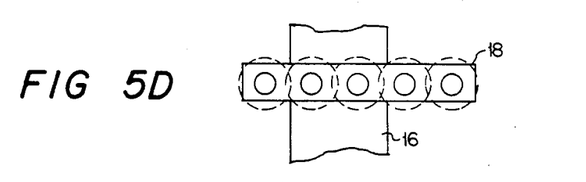
Figure 5E:
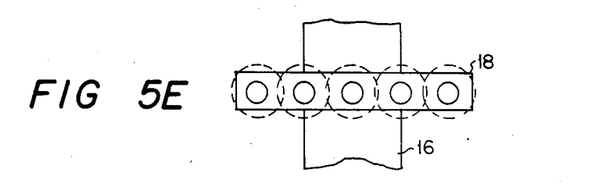
Figure 5F:
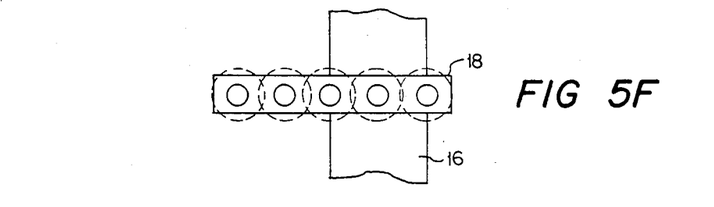

Since the reflective sensor 20a has the retroreflective tape 16 occupying less of its field of view than does sensor 20c, the sensor output voltage $V_B$ produced is lower and the stair-step signal $V_{ss}$ cross-over occurs sooner, causing the comparator circuit output signal $V_{BB}$ for comparator circuit 46a to go high sooner than the comparator output signal $V_{DD}$ for comparator circuit 46c. As can be best seen in the data table of FIG. 6.c corresponding to the example of FIG. 5.c, the bit of the byte generated based on the sensor 20a will be a binary "0" during the first 3 sampling occasions of the 10 millisecond example period and a binary "1" during the remaining 7 sampling occasions. In comparison, the bit of the byte generated based upon the sensor 20c will be a binary "0" during the first 7 sampling occasions of the 10 millisecond period and a binary "1" only during the remaining 3 sampling occasions.

It is noted that had the sensor been directly over the edge of the retroreflective tape 16, such as is the situation for sensors 20b and 20d in the example of FIG. 5.e, the bit would be a binary "0" for the first 5 sampling occasions, and a binary "1" for the second 5 sampling occasions (see FIG. 6.e). This is because the output voltage signals of the sensors 20b and 20d would be at the analog voltage level of $V_c$ in Chart 1 of FIG. 3 where during the first one-half of the 10 millisecond period, the stair-step signal $V_{ss}$ is below the sensor voltage signal, and during the second one-half of the period the stair-step signal $V_{ss}$ is above the sensor voltage signal.

Referring back to the example of FIG. 5.c, as shown in the corresponding data table of FIG. 6.c, the byte generated for the first 3 sampling occasions is "00011". The mathematical value of the byte, converted into an equivalent base number-10 table location value, is the number "3". Using the left edge lookup Table 7a, the microprocessor 62 will read from the 3rd table location, the vehicle indicating value stored there of "+2".

The byte generated for the fourth through seventh sampling occasions is "10011", which is the table location value "19". In the lookup Table 7a, at the 19th table location is stored the vehicle indicating value "+1".

The byte generated for the last 3 sampling occasions is "10111", which is the table location value "23". In the lookup Table 7a, at the 23rd table location is stored the vehicle indicating value "+2".

The vehicle indicating values for each sampling occasion must now be mathematically summed together to generate the final vehicle command. Thus, there are three occasions with a vehicle indicating value of +2 (first-third), four occasions with a value of +1 (fourth-seventh), and three occasions with a value of +2 (eighth-tenth), for a total summed value of +16 as the final vehicle command (see the entry in the "Vehicle Indicating Value" column so labeled in FIG. 6.c). The positive or negative sign of the final vehicle command constitutes a vehicle lateral directional command to control the direction of lateral movement of the vehicle 12 as it travels along the path defined by the retroreflective tape 16. The magnitude or absolute value of the final vehicle command constitutes a vehicle lateral displacement command to control the amount of lateral movement of the vehicle required as it travels along the path.

The fact that the final vehicle command in the example of FIGS. 5.c and 6.c generated by the summation has a positive value indicates that the vehicle 12, or more precisely the sensor array 18, is to the right of the center of the desired path and should turn left to accomplish leftward lateral directional movement. As can be seen in FIG. 5.c, the center sensor 20c is positioned to the right of the longitudinal center line of the retroreflective tape 16 and movement to the left is clearly necessary. The relative magnitude of the final vehicle command indicates the lateral displacement of the sensor array 18 from the center of the desired path.

For purposes of illustration, in the series of examples in FIGS. 5.b, 5.c, 5.d and 5.e, the sensor array 18 is shown at progressively decreasing distances to the right of the center of the retroreflective tape 16, such as might occur during the normal movement of the vehicle 12 to correct for being slightly off center tape. As can be seen in the respective corresponding FIGS. 6.b, 6.c, 6.d and 6.e, the final vehicle commands generated by summing the vehicle indicating values for each of the 10 millisecond example periods produces the series of commands +20, +16, +13 and 0 as the vehicle in each successive position moves to the left. The direction of lateral movement is indicated as constant to the left, but the amount of lateral movement required decreases as the vehicle moves to the left, until in FIG. 5.e the sensor array is aligned with the longitudinal center line of the tape 16 and the final vehicle command is "0". The "0" final vehicle command indicates that no further lateral movement is necessary. As a comparison, the example of FIG. 5.f is provided where the final vehicle command is −15. This indicates that the vehicle 12 is to the left of center tape and lateral movement to the right is needed, and the relative amount of vehicle lateral movement necessary.

If the vehicle 12 reached a Y-branch intersection, such as where one path is a straight continuation of the path being traveled by the vehicle and another path is angled off to the right, such as shown by retroreflective tape 16a in FIG. 1, which path the sensor array 18 follows depends on the edge of the tape the control system is instructed to follow. The control system 10 may be manually set to follow either the left or right edge of the tape, or in a more sophisticated system, preprogrammed to follow one or the other edge during a portion of the vehicle travel and then changed to the other edge as necessary in order to selectively follow a left or right Y-branch in the track, as will be described in more detail below. The control system 10 may also be programmed to act upon receiving in-use instructions sensed by the vehicle..

For purposes of illustration, the control system 10 will be described as programmed to follow the left edge of the retroreflective tape 16 as has been assumed for the prior examples. Furthermore, the sensor array 18 will be initially positioned aligned on the center of the tape 16, while traveling along the straight path. Since the sensor array 18 is following the left edge of the tape 16, as the vehicle moves forward more and more of the right side reflective sensors 20b–e of the array will suddenly begin having the tape completely or partially within their field of view because the path widens at the juncture of the two tapes 16 and 16a. Thus, the sensor voltage signals for these right side sensors will tend to increase and the corresponding comparator circuits will tend to be more at binary "0", which, for example, may produce a byte such as "10000". If the byte is constant at this value for the entire 10 millisecond period, a table location value of "16" will be generated. The vehicle indicating values stored at locations "16" of left edge lookup Table 7a is +1, which when summed for each sampling occasion produces a final vehicle command value of +10. This final vehicle command indicates a slight corrective movement to the left is required so as to continue following the left edge of the tape 16a beyond the intersection.

If, however, prior to the Y-branch intersection, the control system 10 has a program change to follow the right edge of the tape, the microprocessor 62 will use the right edge following lookup Table 7b to read the vehicle indicating value at table location "16". The vehicle indicating value in such a situation is the −4, which when summed for each sampling occasion produces a final vehicle command value of −40. This final vehicle command indicates a significant corrective movement to the right is required to follow the right edge of the tape 16, and hence to continue on the straight path beyond the intersection. Such a final vehicle command will cause the vehicle 12 to make a pronounced right correction and the sensor array 18 will effectively search for and follow the right edge of the tape henceforward.

From the foregoing, it will be appreciated that, although embodiments of the invention have been described herein for purposes of illustration, various modifications may be made without deviating from the spirit and scope of the invention. Accordingly, the invention is not limited except as by the appended claims.

I claim:

1. A control system for guiding a vehicle over a floor along a long, narrow stripe of reflective material applied to the floor to define a desired path for the vehicle to travel, comprising:
means for generating light and directing said light toward the reflective material;
a generally linear array of light sensors mountable on the vehicle generally transverse to the stripe of reflective material, each sensor having a field of view and generating an output signal generally proportional to the portion of the sensor's field of view occupied by the reflective material;
reference signal means for generating a reference signal with an amplitude generally unidirectionally and progressively changing over a preselected time period;

means for comparing each of said sensor output signals to said reference signal during said preselected time period, and generating a binary output signal having binary states for each of said sensors, said binary output signal in one binary state indicating if the amplitude of said sensor output signal is above said reference signal and in the other binary state indicating if the amplitude of said sensor output signal is below said reference signal;

means for sampling the value of each of said sensor binary output signals on a plurality of sampling occasions during said preselected time period and combining said sampled values of said sensor binary output signals for each sampling occasion in a predetermined order to generate a byte;

value determining means for providing for each said byte a corresponding position indicating value indicative of the lateral position of said sensor array relative to the reflective material at the time of said sampling occasion based upon the changing threshold provided by said reference signal; and summing means for mathematically summing all said position indicating values for said one preselected time period and generating a vehicle command comprising a vehicle lateral directional command to control the direction of lateral movement of the vehicle as it travels along the path and a vehicle lateral displacement command to control the amount of lateral movement of the vehicle as it travels along the path.

2. The control system of claim 1 wherein each of said bytes generated during said preselected time period comprises a corresponding table location value, and said value determining means includes:

a look-up table storing a plurality of said position indicating values, each position indicating value being stored at a table location corresponding to one of said table location values, each said position indicating value comprising a vehicle lateral directional command component indicative of the amount of lateral movement of the vehicle required to travel along the path, and a vehicle lateral displacement command component indicative of the amount of lateral movement of the vehicle required to travel along the path, said vehicle directional and displacement command components being based upon the lateral position of said sensor array relative to said reflective material at the time of said sampling occasion corresponding to each of said bytes as measured using the changing threshold provided by said reference signal; and look-up means for looking up ones of said position indicating values stored in said look-up table at said table locations corresponding to said table location values.

3. The control system of claim 2 wherein said look-up table includes a first table storing a first plurality of said position indicating values, each comprising one of said vehicle directional and displacement command components directing the vehicle to follow the left edge of the reflective material, and a second table storing a second plurality of said position indicating values, each comprising one of each of said vehicle directional and displacement command components directing the vehicle to follow the right edge of the reflective material.

4. The control system of claim 3, further including:

selection means for selecting whether the vehicle is to follow the left or right edge of the reflective material in response to instruction to the control system; and means responsive to said selection means for causing said look-up means to look up said position indicating value at said table location in the one of said first or second tables corresponding to the left or right edge selected by said selecting means for the vehicle to follow.

5. The control system of claim 3 wherein said reference signal means includes a generally ramped signal.

6. A control system for guiding a vehicle over a floor along a long, narrow stripe of reflective material applied to the floor to define a desired path for the vehicle to travel, comprising:

means for generating light and directing said light toward the reflective material;

a generally linear array of light sensors mountable on the vehicle generally transverse to the strip of reflective material, each sensor having a field of view and generating an output signal generally proportional to the portion of the sensor's field of view occupied by the reflective material;

reference signal means for generating a reference signal with an amplitude generally unidirectionally and progressively changing over a preselected time period;

means for comparing each of said sensor output signals to said reference signal on a plurality of sampling occasions during said preselected time period, and on each sampling occasion generating a binary output having binary states for each of said sensors, said binary output in one binary state indicating if the amplitude of said sensor output signal is above said reference signal and in the other binary state indicating if the amplitude of said sensor output signal is below said reference signal;

position value means for combining said sensor binary outputs generated for each sampling occasion and deriving a position indicating value therefrom indicative of the lateral position of said sensor array relative to the reflective material at the time of said sampling occasion based upon the changing threshold provided by said reference signal; and means for combining all said position indicating values for said one preselected time period and generating a vehicle command therefrom comprising a vehicle lateral directional command to control the direction of lateral movement of the vehicle as it travels along the path.

7. The control system of claim 6 wherein said position value means combines said sensor binary outputs generated for each sampling occasion in a predetermined order to generate a byte, with each said byte comprising one of said corresponding position indicating values.

8. The control system of claim 6 wherein said vehicle command for said one preselected time period further comprises a vehicle lateral displacement command to control the amount of lateral movement of the vehicle as it travels along the path.

9. The control system of claim 8 wherein said position value means includes:

means for converting said binary outputs for each sampling occasion generated during said one preselected time period into a corresponding table location value;

a look-up table storing a plurality of said position indicating values, each position indicating value being stored at a table location corresponding to one of said table location values, each said position indicating value comprising a vehicle lateral directional command component indicative of the direction of lateral movement of the vehicle required to travel along the path and a vehicle lateral displacement command component indicative of the amount of lateral movement of the vehicle required to travel along the path, said vehicle direction and displacement command components being based upon the lateral position of said sensor array relative to said reflective material at the time of said sampling occasion corresponding to said table location value as measured using the changing threshold provided by said reference signal; and look-up means for looking up ones of said position indicating values stored in said look-up table at said table locations corresponding to said table location values.

10. The control system of claim 9 wherein said look-up table includes a first table storing a first plurality of said position indicating values, each comprising one of said vehicle directional and displacement command components directing the vehicle to follow the left edge of the reflective material, and a second table storing a second plurality of said position indicating values, each comprising one of each of said vehicle directional and displacement command components directing the vehicle to follow the right edge of the reflective material.

11. The control system of claim 10, further including:
means for selecting whether the vehicle is to follow the left or right edge of the reflective material in response to instruction to the control system; and
means for causing said look-up means to look up in the one of said first or second tables corresponding to the left or right edge selected by said selecting means for the vehicle to follow, each of said first and second tables including corresponding ones of said first or second plurality of said position indicating values stored at said table locations corresponding to said table location values.

12. The control system of claim 6 wherein said reference signal means includes a generally ramped signal.

13. The control system of claim 6 wherein said reference signal is a stair-step signal, and said reference signal means includes clock means for generating a clock signal, counter means for counting said clock signals up to a predetermined number during said preselected time period and generating count indicating signals, and summing means for summing said count indicating signals and therefrom generating said stair-step signal.

14. A control system for guiding a vehicle over a floor, comprising:
a long, narrow stripe of retroreflective material adhesively applied to the floor to define a desired path for the vehicle to travel along;
means for generating light and directing said light toward said retroreflective material;
a generally linear array of a plurality of light sensors mountable on the vehicle generally transverse to said stripe of retroreflective material, each sensor having a field of view and generating an output signal generally proportional to the portion of the sensors's field of view occupied by said retroreflective material;
means for repetitively generating a reference signal with an amplitude changing over a preselected time period;

means for comparing each of said sensor output signals to said reference signal during said preselected time period, and generating a binary output signal having binary states for each of said sensors, said binary output signal in one binary state indicating if the amplitude of said sensor output signal is above said reference signal and in the other binary state indicating if the amplitude of said sensor output signal is below said reference signal;
means for sampling the value of each of said sensor binary output signals on a plurality of sampling occasions during said preselected time period and combining said sampled values of said sampled sensor binary output signals for each sampling occasion in a predetermined order to generate a byte, with each byte indicative of the lateral position of said sensor array relative to said retroreflective material at the time of said sampling occasion based upon the changing threshold provided by said reference signal; and
converting means for converting said bytes generated for said sampling occasions during said preselected time period into a vehicle lateral directional command therefrom to control the direction of lateral movement of the vehicle as it travels along said path.

15. The control system of claim 14 wherein said converting means comprises:
means for deriving a vehicle position indicating value corresponding to each of said bytes generated during said preselected time period; and
means for mathematically summing the values of said position indicating values derived from said bytes for said sampling occasions during said one preselected time period and generating a summed value for said one preselected time period, said summed value for said one preselected time period comprising said vehicle lateral directional command, whereby said vehicle lateral directional command is based upon the composite lateral directional position of said sensor array relative to said retroreflective material determined at each of said sampling occasions during said one preselected time period as measured using the changing threshold provided by said reference signal, and whereby the control system increases its resolution by effectively interpolating the position of the retroreflective material between pairs of said sensors.

16. The control system of claim 15 wherein said summed value for said one preselected time period further comprises a vehicle lateral displacement command to control the amount of lateral movement of the vehicle as it travels along said path, whereby said vehicle lateral displacement command is based upon the composite lateral displacement of said sensor array relative to said retroreflective material determined at each of said sampling occasions during said open preselected time period as measured using the changing threshold provided by said reference signal.

17. The control system of claim 15 wherein each of said bytes generated during said one preselected time period corresponds to a table location value, and said means for deriving said vehicle position indicating values further includes:
a look-up table storing a plurality of said position indicating values, each position indicating value being stored at a table location corresponding to one of said table location values, each said position indicating value comprising a vehicle lateral directional command component indicative of the direction of lateral movement of the vehicle required to travel along the path and a vehicle lateral displacement command component indicative of the amount of lateral movement of the vehicle required to travel along the path, said vehicle directional and displacement command components being based upon the lateral position of said sensor array relative to said retroreflective material at the time of said sampling occasion corresponding to each of said bytes as measuring using the changing threshold provided by said reference signal; and look-up means for looking up ones of said position indicating values stored in said look-up table at said table locations corresponding to said table location values.

18. The control system of claim 17 wherein said look-up table includes a first table storing a first plurality of said position indicating values, each comprising one of said vehicle directional and displacement command components directing the vehicle to follow the left edge of the reflective material, and a second table storing a second plurality of said position indicating values, each comprising one of each of said vehicle directional and displacement command components directing the vehicle to follow the right edge of the reflective material.

19. A method for guiding a vehicle along a long, narrow strip of reflective material defining a desired path for the vehicle to travel, comprising:

generating light and directing the light toward the reflective material;

providing a generally linear array of light sensors mountable on the vehicle generally transverse to the stripe of reflective material, with each sensor having a field of view;

generating an output signal generally proportional to the portion of the sensor's field of view occupied by the reflective material;

generating a reference signal with an amplitude generally unidirectionally and progressively changing over a preselected time period;

comparing each of said sensor output signals to said reference signal during said preselected time period;

generating a binary output signal having binary states for each of said sensors, with said binary output signal in one binary state being indicative of whether the amplitude of said sensor output signal is above said reference signals and in the other binary state being indicative of whether the amplitude of said sensor output signal is below said reference signal;

sampling the value of each of said sensor binary output signals on a plurality of sampling occasions during said preselected time period;

combining said sampled values of said sensor binary output signals for each sampling occasion in a predetermined order to generate a byte, with each said byte being indicative of a lateral position of said sensor array relative to the reflective material at the time of said sampling occasion based upon the changing threshold provided by said reference signal and with each said byte corresponding to a table location value;

providing a look-up table storing a plurality of position indicating values, each position indicating value being stored at a table location corresponding to one of said table location values, with each said position indicating value comprising a vehicle lateral directional command component indicative of the direction of lateral movement of the vehicle and a vehicle lateral displacement command component indicative of the amount of lateral movement of the vehicle required to travel along the path;

looking up ones of said position indicating values stored in said look-up table at said table locations corresponding to said table location values corresponding to said bytes generated for said one preselected time period; and mathematically summing all of said position indicating values for said one preselected time period and generating a summed vehicle command comprising a vehicle lateral directional command and a vehicle lateral displacement command to control the direction of lateral movement and the amount of lateral movement of the vehicle as the vehicle moves along the path.

20. The method of claim 19, further including a first table storing a first plurality of said position indicating values, each comprising one of said vehicle directional and displacement command components directing the vehicle to follow the left edge of the reflective material, and a second table storing a second plurality of said position indicating values, each comprising one of each of said vehicle directional and displacement command components directing the vehicle to follow the right edge of the reflective material; and providing means for selecting whether the vehicle is to travel the left or right edge of the reflective material in response to instruction to the control system.

21. A control system for guiding a vehicle along a long, narrow stripe of reflective material defining a desired path for the vehicle to travel, comprising:

a light source generating light and directing the light toward the reflective material;

a generally linear array of light sensors mountable on the vehicle generally transverse to the strip of reflective material, each sensor having a field of view and generating an output signal generally proportional to the portion of the sensor's field of view occupied by the reflective material;

a reference signal generator generating a reference signal with an amplitude generally unidirectionally and progressively changing over a preselected time period;

a comparator comparing each of said sensor output signals to said reference signal on a plurality of sampling occasions during said preselected time period, and on each sampling occasion generating a binary output signal having binary states for each of said sensors, said binary output signal in one binary state indicating if the amplitude of said sensor output signal is above said reference signal and in the other binary state indicating if the amplitude of said sensor output signal is below said reference signal;

a byte generator sampling the value of each of said sensor binary output signals on a plurality of sampling occasions during said preselected time period and combining said sampled values of said sensor binary output signals for each sampling occasion in a predetermined order to generate a byte, with each said byte being indicative of the lateral position of said sensor array relative to the reflective material at the time of said sampling occasion based upon the changing threshold provided by said reference signal and with each said byte corresponding to a table location values;

a look-up table storing a plurality of position indicating values, each position indicating value being stored at a table location corresponding to one of said table location values, with each said position indicating value comprising a vehicle lateral directional command component indicative of the direction of lateral movement of the vehicle required to travel along the path and a vehicle lateral displacement command component indicative of the amount of lateral movement of the vehicle required to travel along the path, said vehicle directional and displacement command components being based upon the lateral position of said sensor array relative to said reflective material at the time of said sampling occasion corresponding to each of said bytes as measured using the changing threshold provided by said reference signal;

a look-up device which looks up ones of said position indicating values stored in said look-up table at said table locations corresponding to said table location values corresponding to said bytes generated for said one preselected time period; and a summer mathematically summing all said position indicating values for said one preselected time period and generating a final vehicle command comprising a vehicle lateral directional command and a vehicle lateral displacement command to control the direction and amount of lateral movement of the vehicle as the it travels along the path.

22. The control system of claim 21 wherein said look-up table includes a first table storing a first plurality of said position indicating values, each comprising one of said vehicle directional and displacement command components directing the vehicle to follow the left edge of the reflective material, and a second table storing a second plurality of said position indicating values, each comprising one of each of said vehicle directional and displacement command components directing the vehicle to follow the right edge of the reflective material.

* * * * *